United States Patent
Chiu

(10) Patent No.: US 7,983,501 B2
(45) Date of Patent: Jul. 19, 2011

(54) NOISE DETECTION AND ESTIMATION TECHNIQUES FOR PICTURE ENHANCEMENT

(75) Inventor: Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1134 days.

(21) Appl. No.: 11/693,453

(22) Filed: Mar. 29, 2007

(65) Prior Publication Data

US 2008/0239153 A1     Oct. 2, 2008

(51) Int. Cl.
*G06K 9/40*     (2006.01)
*H04N 1/409*     (2006.01)
*H04N 5/00*     (2011.01)

(52) U.S. Cl. ....... 382/254; 382/260; 382/275; 358/3.27; 348/607

(58) Field of Classification Search .................. 382/254, 382/232–233, 260–269, 274–275, 305, 312; 348/607, 533; 358/3.26, 3.27

See application file for complete search history.

(56) References Cited

U.S. PATENT DOCUMENTS

| | | | |
|---|---|---|---|
| 6,072,538 | A | 6/2000 | Keating |
| 7,003,174 | B2 * | 2/2006 | Kryukov et al. ............. 382/266 |
| 2005/0281479 | A1 | 12/2005 | Song |
| 2007/0071356 | A1 * | 3/2007 | Caviedes et al. ............. 382/268 |

FOREIGN PATENT DOCUMENTS

| | | |
|---|---|---|
| JP | 6-315104 | 11/1994 |
| KR | 2002-0000547 | 1/2002 |
| KR | 2002-0081428 | 10/2002 |

OTHER PUBLICATIONS

Korean Patent Office, International Search Report and Written Opinion for corresponding International Application No. PCT/US2008/058154, 9 pgs., Aug. 20, 2008.

European Patent Office, European Search Report issued in corresponding EP Application No. 08799717.7, dated Dec. 21, 2010, 3 pgs.

* cited by examiner

*Primary Examiner* — Kanji Patel

(74) *Attorney, Agent, or Firm* — Trop, Pruner & Hu, P.C.

(57) ABSTRACT

A method of filtering noise from a picture may include determining a set of pixel noise metrics for a set of selected pixels in the picture based solely on information from the set of selected pixels in the picture. The method may also designate as valid a subset of pixel noise metrics in the set of pixel noise metrics those associated pixels are not located at an edge or are not located in a complicated area of the picture. A set of block noise metrics may be calculated from the valid subset of pixel noise metrics, and a global noise metric for the picture may be ascertained from the set of block noise metrics. The picture may be filtered using the global noise metric to generate a filtered picture.

9 Claims, 3 Drawing Sheets

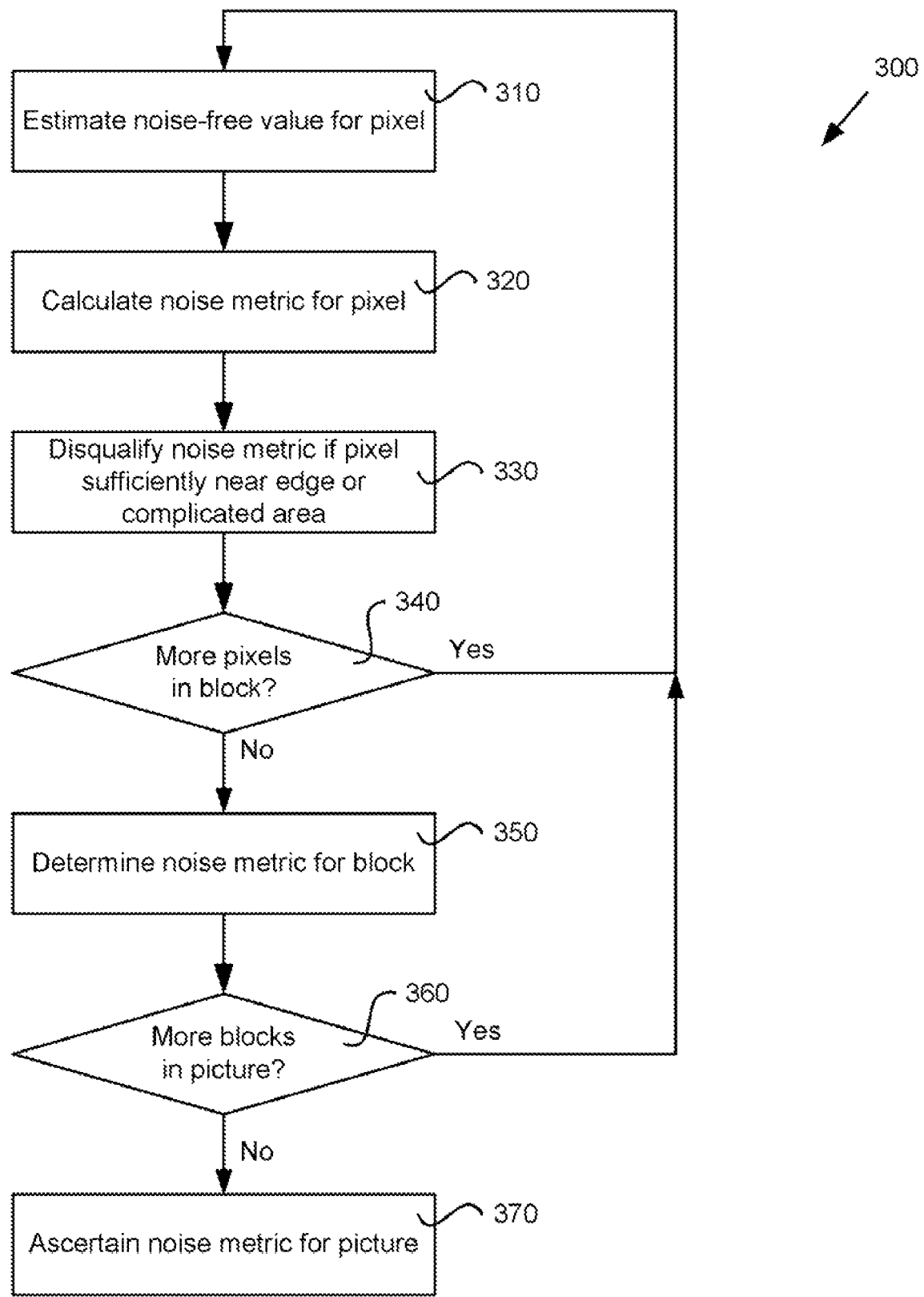

NOISE DETECTION AND ESTIMATION TECHNIQUES FOR PICTURE ENHANCEMENT

BACKGROUND

Implementations of the claimed invention generally may relate to the field of noise detection, and in particular to noise detection and estimation in images and/or video.

In the area of image/video applications, picture noise is an undesirable picture viewing appearance that may be caused by any of the imperfect processes of video capturing, transmission, and/or storage. Reducing the visual artifacts of picture noise is an important pursuit in the fields of noise filtering. In general, it is known that noise filtering usually blurs the high-detailed content in addition to removing noise. For this reason, it may be desirable not to apply the noise filtering unless it is determined with a reasonable degree of certainty that the picture noise is visually apparent in the picture. Thus, a noise detection device is typically needed for the proper, selective application of noise filtering.

A noise detection device may produce two pieces of information: the occurrence of the noise and the strength of the noise level. A noise detection device may use a single value, for example, it has a non-zero value when noise is present, and a zero or null value when noise is not present. The magnitude of the non-zero value may indicate the strength of the detected noise.

Several approaches have been proposed to detect noise in images/video. One such proposed approach may use the non-active video areas (blanking lines) for measuring the amount of noise, with the assumption that the signal perturbation in these areas comes from the noise only. One issue with this approach is that one cannot be sure if the blanking line may be inserted or cleaned somewhere in an early stage of the video process. Thus, what is assumed to be noise within the blanking line may not in fact be, or in any event may not correspond to the noise within the image or video.

Another such proposed approach may use motion detection based on the concept that the area with the minimal motion detection output contains no motion, but a temporal difference that is only due to noise. An issue with such motion detection approaches may be that there is no reliable motion detection information for a period of scene change. Also, the computation and memory complexities involved in the proposed motion detection approach are relatively expensive.

Such proposed approaches to noise detection in images/video may not accurately reflect actual noise in the picture(s), and/or may perform poorly during scene changes. Further, some proposed approaches may not be cost effective in terms of needed circuitry and/or the associated temporal latency.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

FIG. 3 illustrates a method of detecting noise and determining a global noise metric for a picture.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
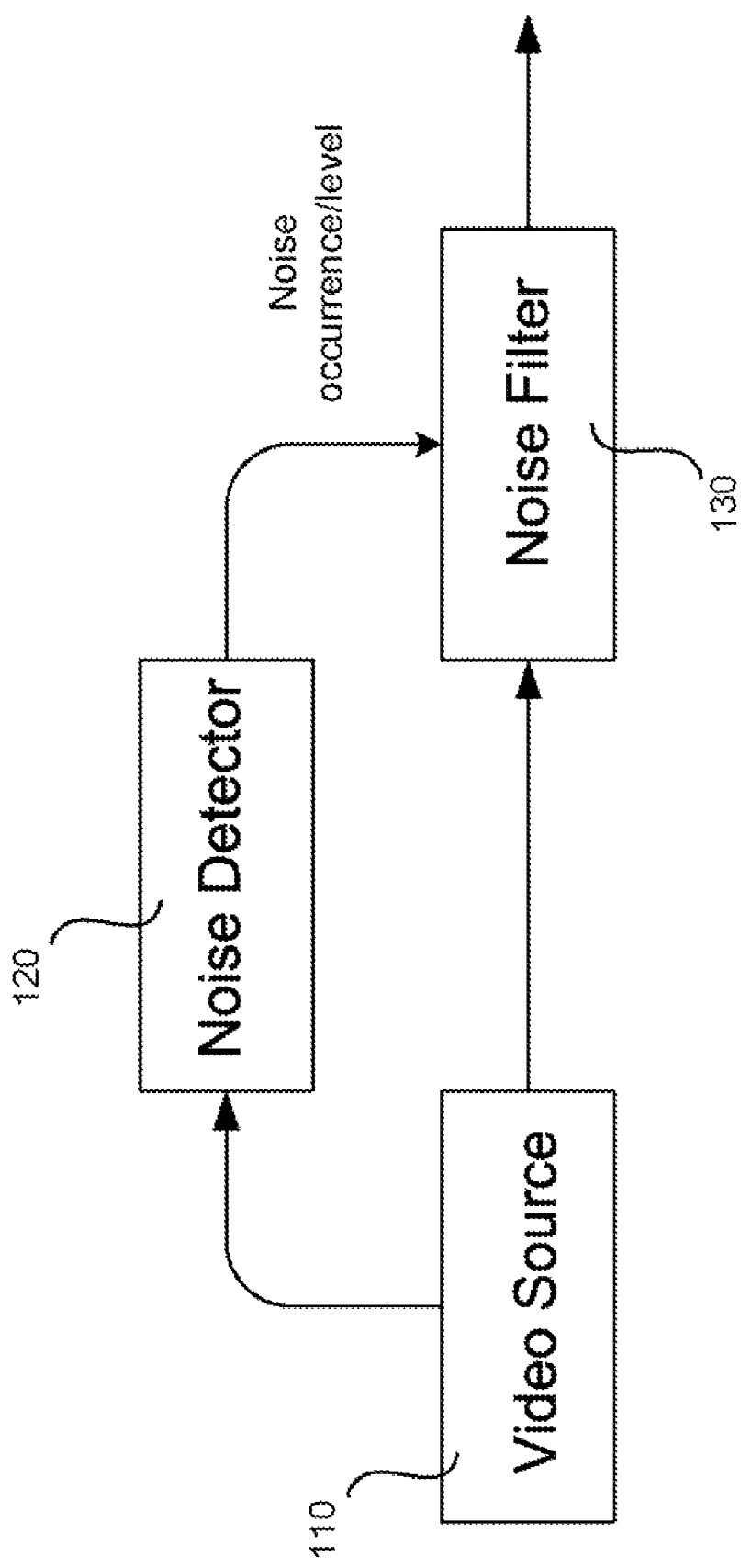
FIG. 1 illustrates an example noise filtering system according to some implementations.

FIG. 1 is a diagram illustrating an example of a noise filtering system 100 in accordance with one implementation consistent with the principles of the invention. System 100 may include video source 110, a noise detector 120, and a noise filter 130. Components 110-130 may be implemented via hardware, firmware, software, or some combination thereof. System 100 may also include other components incident to its operation as a noise filtering system for images and/or video, such as a additional logic, processor(s), a display on which to show the noise-filtered data, etc. Although such additional components are not explicitly shown in FIG. 1 for ease and brevity of description, they may nonetheless be present in noise filtering system 100.

Video source 110 may include any type of storage or transmission media that may operate as source of video information. For example, source 110 may include a memory, such as a frame buffer, to temporarily store one or more images or frames within a stream of video information. As will be explained further, video source 110 need only store one image, or frame, of video information for noise detector 120 to operate on, although it may store more images or frames in some implementations. The video information in source 110 may be encoded in any known or later-developed video encoding scheme or standard, including but not limited to MPEG-1, MPEG-2, MPEG-4, H.264, VC1, and/or Advanced Video System (AVS) formats.

Also, although source 110 has been described as a source of video information, it may contain in some implementations a sequential sequence of images or pictures. In some implementations where video is predictively encoded, source 110 or detector 120 may extract actual images (e.g., I frames) from the other difference-coded information (e.g., P frames and/or B frames).

Noise detector 120 may be arranged to examine an image or frame of picture or video data and to determine a global noise measure for the whole image or frame. Noise detector 120 need only examine pixels in a single image to determine the noise measure to be sent to noise filter 130, but noise detector 120 may use, for example, one or more prior noise measures to temporally smooth or average the global noise measure for the current image. The noise measure output to filter 130 may indicate the occurrence or non-occurrence of noise in an image and, if applicable, the level of such noise so that filter 130 may appropriately reduce or remove visual artifacts from the noise.

Figure 2:
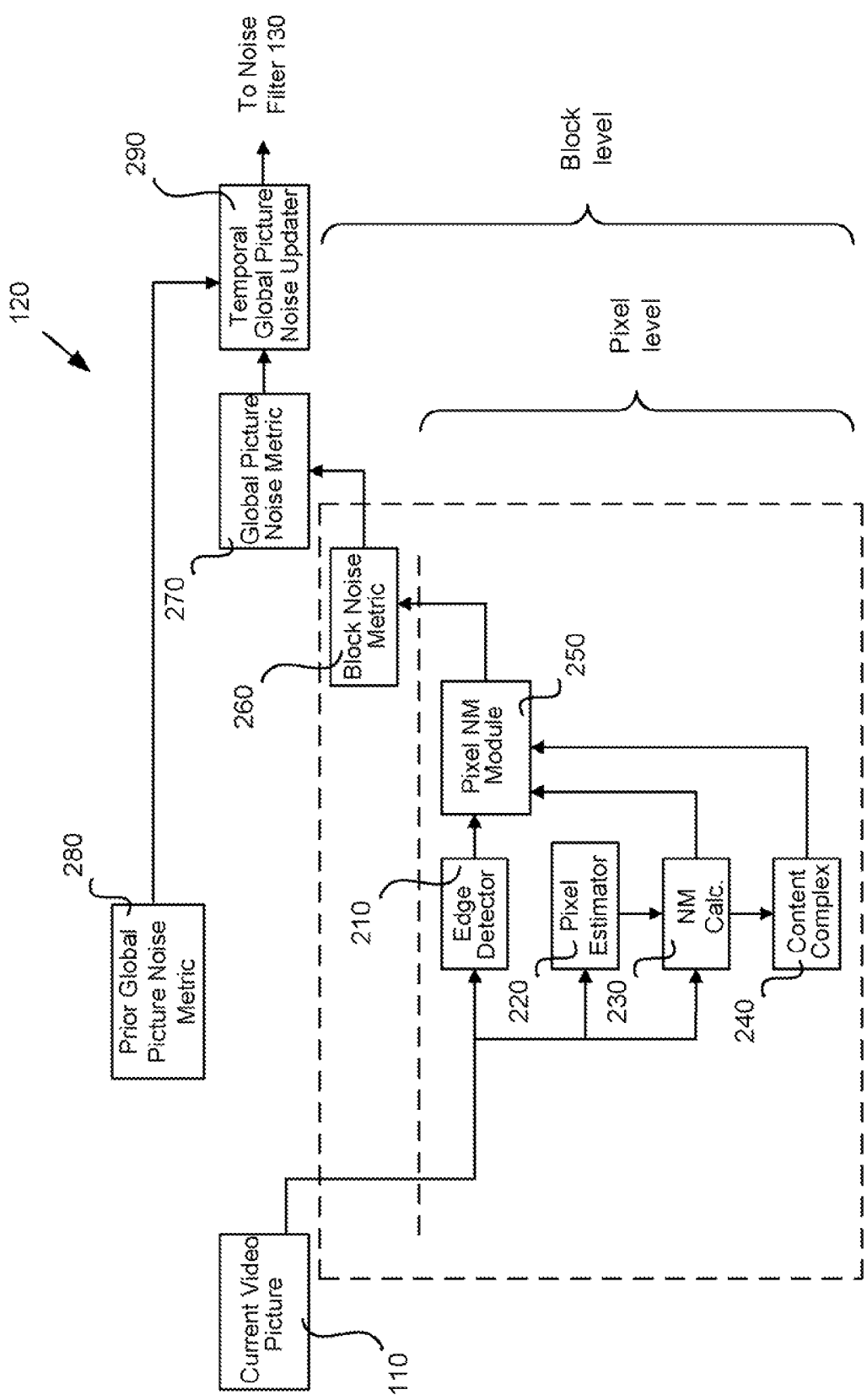
FIG. 2 illustrates an example of the noise detector of FIG. 1.

FIG. 2 illustrates an example of noise detector 120. Noise detector 120 may include edge detector 210, pixel estimator 220, noise metric (NM) calculator 230, content complexity module 240, pixel NM module 250, block NM module 260, global picture NM module 270, prior global picture NM value 280, and temporal global picture noise updater 290. Although components 210-290 are shown separately for ease of explanation, their respective functionalities may be combined in one or more modules in some implementations. Components 210-290 may be implemented via circuitry, hardware, firmware, software, or some combination thereof.

Also, as illustrated in FIG. 2, components 210-250 may perform pixel-level operations, component 260 may perform block-level operations, and components 270-290 may perform picture-level operations. For example, components 210-250 may calculate the pixel NM for some (e.g., the total number of pixels in a block may be subsampled) or all of the pixels in a block. Similarly, component 260 may calculate the block NM for some (e.g., the total number of blocks in a picture may be subsampled) or all of the blocks in a picture or image. Global picture NM module 270 may calculate the global picture NM from all available block NMs, which may be less than the number of blocks in the picture. These will be explained in greater detail below.

Pixel-Level Operations:

Edge detector 210 may function to detect whether a pixel of interest is at or sufficiently near an edge. Such edge detection information may be used in a content analysis by pixel NM module 250 to include or exclude noise associated with the pixel of interest. Various edge detection schemes may be employed by edge detector 210, including but not limited to a Canny edge algorithm, first derivative edge detection, a Sobel edge algorithm, etc.

As one illustrative example, edge detector 210 may apply a Sobel edge operator in up to four directions. As one specific example, a 3×3 neighborhood NH9($x$) around a pixel of interest may be convolved with one of the following weightings:

$$E\_h = \begin{bmatrix} -1 & -2 & -1 \\ 0 & 0 & 0 \\ 1 & 2 & 1 \end{bmatrix}$$

$$E\_v = \begin{bmatrix} -1 & 0 & 1 \\ -2 & 0 & 2 \\ -1 & 0 & 1 \end{bmatrix}$$

$$E\_P45 = \begin{bmatrix} -2 & -1 & 0 \\ -1 & 0 & 1 \\ 0 & 1 & 2 \end{bmatrix}$$

$$E\_N45 = \begin{bmatrix} 0 & -1 & -2 \\ 1 & 0 & -1 \\ 2 & 1 & 0 \end{bmatrix}$$

It should be noted that E_h weights in a horizontal direction; E_v in a vertical direction; E_P45 in a 45 degree angle in one direction; and E_P45 in a 45 degree angle in another direction.

The edge metric (EM) produced by edge detector 210 for the target pixel x is formulated as the convolution of one or more of the above weightings with its 3×3 neighborhood NH9($x$) as (in some implementations):

EM($x$)=|NH9($x$)*E_$h$|+|NH9($x$)*E_$v$|+|NH9($x$)*E_P45|+|NH9($x$)*E_N45|

In some implementations, the use by edge detector 210 of just two directions, E_v and E_h, may be sufficient for many applications. Thus, the last two terms in the above equation for EM(x) need not be calculated in some implementations. Similarly, in other implementations the use of just two other directions, E_P45 and E_N45, may be sufficient. The addition of detection at 45 degrees to the horizontal and vertical detections further improves the edge detection, but with additional computational complexity. In any event, edge detector 210 may output the edge metric EM(x) for a pixel of interest, x, for further processing by pixel NM module 250.

Pixel estimator 220 may function to estimate a noise-free value for the pixel of interest. In general, pixel estimator 220 may perform some type of smoothing based on the pixel of interest and at least some of its neighbors. For example, pixel estimator 220 may include a median filter, a mean filter (in any neighborhood, 3×3, 4×4, 5×5, etc., of the pixel), or some weighted combination of the current pixel and at least some of its neighbor pixels. Other schemes are both possible and contemplated for pixel estimator 220 to estimate the noise-free or "true" value of the pixel of interest, x.

In some implementations, pixel estimator 220 may include a 3×3 median filter. Given the target pixel x, a 3×3 neighborhood of x may be defined and denoted as NH9($x$) (as above, though elements 210 and 220 need not necessarily use the same or similar neighborhoods). Pixel estimator 220 may use the median of NH9($x$), denoted as "median(x)," as the noise free pixel value of the NH9($x$). In some implementations, as another example, a median 5 filter based on the 4 closer neighbors (e.g., to the top, bottom, left, and right) and the target pixel x may be used with good result. In any event, pixel estimator 220 may output its estimate for the noise-free pixel x (e.g., median(x) in some implementations) to NM calculator 230.

NM calculator 230 may generate a noise metric (NM) for the pixel of interest, x. Any known type of noise metric scheme (e.g., first order (difference), second order (square of difference), etc.) may be used by NM calculator 230 to generate NM(x).

In some implementations, NM calculator 230 may generate NM as the summation of the absolute difference among the estimated value from estimator 220 (e.g., median(x)) and every pixel y within NH9($x$). This may expressed as:

NM($x$)=sum(abs($y$−median9(NH($x$))))

It should be noted, however, that the neighborhood used for the differences (or square of differences, etc.) used to calculate NM(x) may, but need not necessarily be, the same as the neighborhoods used by detector 210 and/or estimator 220. That said, a 3×3 (or possibly smaller) neighborhood may consume less resources to perform a given function, while still being robust enough to generate acceptable results. NM calculator 230 may output NM(x) to both noise content complexity module 240 and pixel NM module 250.

Content complexity module 240 may function to determine whether the area or neighborhood in which the pixel of interest resides is "complicated" (e.g., contains a relative large range of values). Such complicated area information may be used in a content analysis by pixel NM module 250 to include or exclude noise associated with the pixel of interest. Various schemes may be employed by module 240 to determine whether the area in which the pixel x resides is complicated, including differences, minimum values, maximum values, variance, etc.

As one illustrative example, content complexity module 240 may use expressions during the process of calculating the NM, such as Noise_Max and Noise_Min, the maximum and the minimum value of the absolute difference among the median(x) and every pixel y within NH(x):

Noise_Max(x) Maximum {abs(y−median9(NH(x)))}

Noise_Min(x) Minimum {abs(y−median9(NH(x)))}

In some implementations, however, content complexity module 240 may use more straightforward expressions, such as Noise_Max(x)=Maximum {y} and Noise_Min(x)=Minimum {y}. Other calculations for difference-type, variance-type or extreme-type values are possible.

The measure for whether an area is "complicated," Noise_Max_Min, may be determined by content complexity module 240 as the difference value between Noise_Max and Noise_Min:

Noise_Max_Min(x)=Noise_Max(x)−Noise_Min(x)

Content complexity module 240 may output the Noise_Max_Min(x) for a pixel of interest, x, use by pixel NM module 250, possibly in conjunction with edge metric EM(x) from edge detector 210, to determine whether to use NM(x) from calculator 230 for a particular pixel.

Pixel NM module 250 may function to determine whether or not to use NM(x) provided from NM calculator 230 for a pixel of interest x. In general, pixel NM module 250 may judge a NM to be good (or acceptable) and pass it on, or pixel NM module 250 may judge a NM to be bad (or unacceptable) and disqualify it. For example, pixel NM module 250 may assign an extreme value to those NM(x) values found to be unacceptable.

Pixel NM module 250 may perform a check to ensure the calculated NM to be a good candidate noise measure for the pixel x depending on 1) whether an edge is present and/or 2) whether the pixel is in a complicated area. In some implementations, pixel NM module 250 may use one or more thresholds to determine whether to exclude a pixel's NM value based on edge detection or complicated area detection.

For example, in some implementations pixel NM module 250 may judge a NM to be good (or acceptable) and pass it on if it satisfies the following condition:

((EM(x)<EM_th) AND (Noise_Max_Min(x)<ND_th))

EM_th and ND_th could be two pre-defined values, and in some implementations they may be programmed based on the differing needs of applications. In some implementations, EM_th and ND_th may be determined through a small number of reasonably straightforward trials. In some implementations, EM_th and ND_th may be modified based on NM(s) from prior (e.g., immediately previous) pictures. If the NM from a previous picture is relatively large, for example, then EM_th and ND_th may tend to be bigger for a current picture. In such implementations, relationships may be set up (e.g., linear equations) to specify EM_th and ND_th based on one or more prior noise metric(s).

If the pixel of interest x fulfills both of the above conditions (due to the logical AND) within pixel NM module 250, the pixel x may be considered to be a good candidate for a noise measuring pixel. The pixel's noise metric (NM) may be considered as a good value, and may be stored and/or used in subsequent processing by block NM module 260.

Referring to FIG. 2, components 210-250 below the dashed horizontal line may perform their operations to determine a NM (e.g., a good/valid value or invalid) for each of the pixels in a block that are under consideration. A block may be subsampled in some implementations, however, so the pixel level operations may not necessarily be performed for all pixels in a block in such a subsampled case. The valid or good NMs from the pixel-level operations may be stored and/or sent to block NM module 260 for block-level processing.

Block-Level Operations:

Block NM module 260 may be arranged to determine a block-level noise metric (BNM) from all good/valid pixel NMs. Pixel NMs that are not valid/good may be discriminated and not used by block NM module 260. The size of block may be 16×8 pixels in some implementations. The block size may be changed, however, based on the requirements of associated architecture and/or the needs of associated applications.

In some implementations, block NM module 260 may determine the block-level noise metric (BNM) as the minimum value of the pixel noise metric of the good candidate noise measure pixels inside the block. This relationship may be expressed as follows:

BNM=Minimum {NM(x) of the good candidate pixels that satisfied ((EM(x)<EM_th) AND (Noise_Max_Min(x)<ND_th))}

The block noise metric, BNM, is described based on some or all of the pixels inside the block. Again, sub-sampling of the pixels inside the block may be used in some implementations to reduce the complexity of the implementation. It should be noted that if no pixels in the block fall within the edge detection threshold EM_th and the complicated area threshold ND_th, then the BNM may be an extreme value for that block.

Referring to FIG. 2, block NM module 260 within the dashed box may perform its operation to determine a BNM (e.g., a good/valid value or invalid) for each of the blocks in a picture that is under consideration. A picture also may be subsampled in some implementations, however, so the block-level operation may not necessarily be performed for all blocks in a picture or image in such a subsampled case. The valid or good BNMs from the block-level operations may be stored and/or sent to global picture NM module 270 for picture-level processing.

Picture-Level Operations:

Global picture NM module 270 may form a NM for the whole picture or image based on the valid or good BNMs. Various schemes are possible to aggregate the BNMs for blocks within a picture. In some implementations, for example, global picture NM module 270 may calculate a global picture noise metric (GPNM) as the average of the BNMs for all of the blocks inside the picture. In some implementations, global picture NM module 270 may instead collect histogram data of the BNMs and use a user-defined percentage value to determine the GPNM from the BNM histogram.

Global picture NM module 270 may output the GPNM for the current image to temporal global picture noise updater 290. Similar to the block-level decision, global picture NM module 270 may encounter a case where there are no blocks in a picture with a good/valid BNM value. In such a case, global picture NM module 270 may output an extreme value to temporal global picture noise updater 290 as appropriate for the particular implementation. In any event, noise detector 120 may have mechanisms in place for handling bad or invalid NMs for pixels, bad or invalid BNMs, and/or bad or invalid GPNMs.

Although apparent from the description, it may be noted that the technique by components 210-270 may generate a GPNM from actual image data, avoiding concerns about the fidelity or correspondence of noise in blanking lines to actual noise in the picture or video stream of images. Also, the operations of components 210-270 may be performed on an image largely without regard to other images (e.g., as in motion estimation techniques), and thus may avoid latency concerns associated with other schemes.

Temporal global picture noise updater 290 may function to smooth the calculated GPNM between or among multiple pictures to avoid temporal jitter or flicker due to abruptly varying noise compensation picture-to-picture. Temporal global picture noise updater 290 may generate a temporal global picture noise metric (TGPNM) based on a stored, prior global picture NM value 280 (which may be referred to as a stored TGPNM (STGPNM)). In some implementations, the prior global picture NM value 280 may include the GPNM from the immediately preceding picture or frame, although prior global NM value 280 is not limited to such.

In some implementations, temporal global picture noise updater 290 may compute the TGPNM for the current picture using STGPNM 280 and the GPNM from module 270 according to:

$$TGPNM=C*GPNM+(1-C)*STGPNM$$

The value C is a user defined constant, and it could be programmed based on the needs of a particular application. Updater 290 may output the TGPNM as the final, global noise metric output from noise detector 120 to noise filter 130 for the picture. In some implementations, a predefined value (e.g., a value of zero) may indicate to filter 130 not to perform noise filtering, while other (e.g., non-zero) values may indicate to filter 130 to filter the noise in the picture in question accordingly.

Returning to FIG. 1, noise filter 130 may include any filter that is arranged to receive a global NM for a picture or image and to remove noise accordingly. Due to the operation of components 210-290 in detector 120, filter 130 may not substantially remove fine detail that is mistaken for noise in an image, while performing will in the presence of edges and/or complicated areas in the picture or image. In some implementations, filter 130 may include a tunable noise filter to remove noise based on a single NM. In some implementations, filter 130 may perform robust noise filtering based on the output of detector 120.

After filtering via filter 130, the video data (now with at least some noise removed) may be displayed or buffered for display, although such is not explicitly illustrated in FIG. 1.

FIG. 3 illustrates a method 300 of detecting noise and determining a global noise metric for a picture. Although described with respect to FIGS. 1 and/or 2 for ease of explanation, the scheme described in FIG. 3 should not be construed as limited to the particulars of these other figures.

The method may begin with pixel estimator 220 estimating a noise-free value for a particular pixel [act 310]. As explained above, such estimating may involve some sort of smoothing or filtering or combining of pixel values from the pixel of interest and its neighbor pixels. In some implementations, act 310 may determine the noise-free estimate based on a median filter of at least four neighbor pixels, but act 310 is not limited in this particular regard.

Processing may continue with NM calculator 230 calculating a noise metric for the pixel [act 320]. In some implementations, NM calculator 230 may generate the pixel NM based on first or second order differences between the noise-free value estimated in act 310 and selected surrounding pixel values. In some implementations, the pixel NM may be a sum of absolute differences among the estimated noise-free value and about four to nine of its nearest neighbor pixels. Although the neighborhood of surrounding pixels used in act 320 may be the same or similar to the neighborhood used in act 310, they need not be.

Method 300 may continue with pixel NM module 250 disqualifying the pixel NM calculated in act 320 if the pixel in question is sufficiently near an edge or is in a sufficiently complicated picture area [act 330]. Pixel NM module 250 may use an edge detection result from edge detector 210 and/or a result from noise content complexity module 240 in act 330, along with threshold values (e.g., EM_th and ND_th) to aid in making a determination. These threshold values may be preprogrammed and/or dynamic (e.g., from a prior picture) in nature.

If the pixel NM value is not disqualified in act 330 (i.e., is valid), it may be stored for later use in act 350. If the pixel NM is disqualified in act 330, it may not be used in subsequent processing.

Although FIG. 2 illustrates that pixel NM module 250 may use both edge detection and complicated area to disqualify a pixel NM, in some implementations act 330 may use just one of these. In such implementations, pixel NM module 250 may receive a result from just one of edge detector 210 and noise content complexity module 240, and may use a single threshold (e.g., EM_th or ND_th) to make the disqualifying decision in act 330.

If there are more pixels in a block for which a NM is to be calculated, acts 310-330 may be repeated for a next pixel in the block [act 340]. Such decision may result in pixel NMs for all pixels in a block, provided that the block is not subsampled. If the block is subsampled, it may result in pixel NMs for all representative pixels (e.g., every $2^{nd}$, $3^{rd}$, etc.) pixels in the block. Once all valid pixel NMs have been determined, processing may continue in act 350.

Block NM module 260 may determine a BNM for the block of pixels [act 350]. In some implementations, block NM module 260 may choose the minimum of the good or valid pixel NMs from act 330. In other implementations, block NM module 260 may choose some combination or good NMs, the second, the third lowest NM or the mean value of the good or valid pixel NMs, etc.

If there are no valid or good pixel NM values in the block, the BNM value may not be calculated or used in subsequent picture-level processing. If act 350 produces a valid BNM, it may be stored for later use in act 370.

If there are more blocks in a picture for which a BNM is to be calculated, acts 310-350 may be repeated for a next block in the picture [act 360]. Such decision may result in BNMs for all blocks in a picture, provided that the picture is not block-subsampled and that some block does not contain all invalid pixel NMs. Once all valid BNMs have been determined in act 350/360, processing may continue in act 370.

Processing may continue with global picture NM module 270 ascertaining a global picture noise metric (GPNM) for the picture from all valid BNMs [act 370]. In some implementations, the GPNM may be calculated in act 370 as the average of the BNMs for all of the blocks inside the picture.

In some implementations, act 370 may include a temporal aspect, such as temporal global picture noise updater 290 generating a temporal global picture noise metric (TGPNM) based on a stored, prior global picture NM value 280. In some implementations, the TGPNM may be a weighted combination between the GPNM for the current picture and the GPNM for the previous picture.

Finally, as part of act 370 or as a following act, filter 130 may remove noise in the picture based on the GPNM or TGPNM, and the filtered picture may be displayed on a display device, such as a monitor, television, panel display, or display in a mobile device. If there are no valid BNMs in a picture, however, the GPNM (or TGPNM if this condition is persistent) may be extreme, and filter 130 may not apply noise filtering to that particular picture.

The above-described scheme and/or system may advantageously perform robust noise detection based on the information of only one picture. Compared to a motion detection approach, the above-described scheme does not require temporal latency. Also, the above-described scheme works during a period of scene change when the other approaches fail to deliver robust noise detection. Finally, the above-described scheme is based on the content of the active video which will not be changed during pre-processing of a video pipeline. With the above-described noise detection scheme, the follow-on noise filter(s) 130 may adapt the filter behavior to reduce the noise properly without overcompensating or undercompensating. Thus the picture quality may be improved by reducing the picture noise.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, the scheme herein may be more or less spatially robust in excluding certain pixel NMs. Although the scheme may exclude NMs that are both too near an edge and are located in a complex area, it may be modified to exclude a pixel's NM that meets just one of these conditions. In some implementations, a third spatial measure in addition to edges and complex areas may be used to further discriminate unacceptable or unhelpful pixel NMs.

Further, the scheme herein may be more or less temporal in generating a global NM for a whole picture. Although the scheme may use the temporal information of the global NM from an immediately previous picture, in some implementations additional temporal information (e.g., a weighted sum of the global NMs from the previous few pictures) may also be used to ascertain a global picture NM. In some implementations, however, less temporal information may be employed to reduce jitter. For example, the amount of change of the global picture NM may be limited from picture to picture in either an absolute or relative sense.

Moreover, although a block-by-block scheme has been described, other processing orders are possible and contemplated. For example, NMs may be determined for all pixels (or subsampled pixels) in a picture, and then BNMs may be determined for all blocks (or subsampled blocks) in the picture. Other pixel or block processing orders that perform the functions herein may also be used.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method of filtering noise from a picture, comprising:
   determining a set of pixel noise metrics for a set of selected pixels in the picture based solely on information from the set of selected pixels in the picture;
   designating as valid a subset of pixel noise metrics in the set of pixel noise metrics whose associated pixels are not located at an edge or are not located in a complicated area of the picture;
   calculating a set of block noise metrics from the valid subset of pixel noise metrics;
   ascertaining a global noise metric for the picture from the set of block noise metrics; and
   filtering the picture using the global noise metric to generate a filtered picture.

2. The method of claim 1, wherein the set of selected pixels includes a subsampled set of pixels that is less than a total number of pixels in the picture.

3. The method of claim 1, wherein the set of selected pixels includes all pixels in the picture.

4. The method of claim 1, wherein the determining includes:
   estimating a set of noise-free pixel values for the set of selected pixels; and
   calculating the set of pixel noise metrics based on differences between the set of estimated noise-free pixel values and corresponding neighborhoods around the set of estimated noise-free pixel values.

5. The method of claim 4 wherein the estimating includes:
   median filtering neighborhoods of pixels around the set of selected pixels to obtain the set of estimated noise-free pixel values.

6. The method of claim 1 wherein the designating includes:
   designating as valid the subset of pixel noise metrics whose associated pixels are not located at an edge and are not located in a complicated area of the picture.

7. A video processing system comprising:
   a pixel-level device to generate a pixel noise metric for a pixel in an image of video data based on a difference between an estimated pixel value and its neighbors and to validate the pixel noise metric based on the fact that the metric is not affected by edge or complex area information;
   a block-level device to choose among valid pixel noise metrics for pixels in a block to produce a block noise metric; and
   an image-level device to aggregate block noise metrics for blocks in the image into an image noise metric.

8. The system of claim 7, further comprising:
   a noise filter to selectively remove noise from the image of video data based on the image noise metric.

9. The system of claim 7, wherein the pixel-level device includes:
   a pixel estimator to generate the estimated pixel value,
   a noise metric calculator coupled to the pixel estimator to calculate the pixel noise metric,
   an edge detector to produce the edge detection information,
   a difference module to produce the complex area information, and
   a pixel noise metric module coupled to the edge detector, the difference module, and the noise metric calculator to validate the pixel noise metric based on the edge detection information and the complex area information.

* * * * *